United States Patent [19]
Hohki

[11] 4,367,926
[45] Jan. 11, 1983

[54] LIGHT BEAM INTENSITY STABILIZING METHOD

[75] Inventor: Tetsuo Hohki, Ibaraki, Japan

[73] Assignee: Dainippon Screen Seizo Kabushiki Kaisha, Japan

[21] Appl. No.: 159,389

[22] Filed: Jun. 13, 1980

[30] Foreign Application Priority Data

Jun. 20, 1979 [JP] Japan ................... 54-76684

[51] Int. Cl.$^3$ ............................................. H04B 9/00
[52] U.S. Cl. ................................................. 350/358
[58] Field of Search ................... 350/355, 356, 358; 331/94.5 S

[56] References Cited
U.S. PATENT DOCUMENTS 3,727,062  4/1973  Foster .................... 350/358
4,164,717  8/1979  Blazey ................... 350/358

*Primary Examiner*—William L. Sikes
*Attorney, Agent, or Firm*—Marvin H. Kleinberg

[57] ABSTRACT

A method for stabilizing the intensity of a light beam emitted by a light source and deflected by an acoustooptical deflector element which is controlled by a control signal and is arranged in a scanning exposure head, without regard to deflection angles, wherein a detected light beam intensity is compared with a predetermined reference light intensity. The difference between the light beam intensity and the reference light intensity is detected, and wherein the control signal corresponding to the detected difference is controlled by a stored correction signal which is read out of a memory, so that the intensity of the light beam through the acoustooptical deflector element may be maintained at a certain level.

10 Claims, 4 Drawing Figures

LIGHT BEAM INTENSITY STABILIZING METHOD

BACKGROUND OF THE INVENTION

The present invention relates to a method for stabilizing the intensity of a light beam which is to be deflected by acoustooptical deflector elements, without regard to deflection angles, and more particularly relates to a method for stabilizing the intensity of the light beam which is emitted by a laser, and which is to be deflected by the acoustooptical deflector elements arranged in a scanning exposure head of a picture reproducing machine such as a color scanner, a color facsimile, or the like, without regard to the deflection angles.

In an exposure head for a picture scanning reproducer, and the like, a laser tube is often used nowadays, because of its high brightness, monochromaticity, parallelism of beam, and so forth. An acoustooptical deflector element has been used for deflecting the laser light beam which is passed therethrough. Thus, an exposure head comprising a combination of a laser tube and an acoustooptical deflector element has been developed.

However, in such an exposure head, the intensity of the laser beam from the laser tube varies over a relatively long time period, and the intensity of the light beam deflected by the acoustooptical deflector element also varies depending on the deflection angles. In order to stabilize the intensity of the laser beam various methods have been proposed.

In one conventional stabilizing method, a part of the light beam from the laser tube is reflected by a beam splitter, and the intensity change of the light beam is detected by a light detector. Depending on the intensity change detected, a correction signal in reverse phase to the intensity change of the light beam is produced. The correction signal is amplitude-modulated upon a high-frequency carrier signal. The light beam is then modulated in an optical modulator element by the amplitude-modulated signal, thereby stabilizing the intensity of the light beam.

This method is very efficient for a light beam which varies over a relatively long time period. In some applications, the light beam is deflected in an extremely short time, such as a few microseconds by using an acoustooptical deflector element. For example, in the production of halftone dots in a picture reproducing machine such as a color scanner, the feedback of the correction signal for correcting the intensity change of the light beam, depending on the deflection angles is delayed, and accordingly the response of the acoustooptical deflector element is delayed, with the result that a negative feedback often becomes a positive feedback due to the phase delay of the feedback signal. Hence, in this method, the feedback control can hardly be utilized.

In order to avoid this defect, an electrooptical modulator is used instead of the acoustooptical deflector element. However, the electrooptical modulator is very unstable in presence of the temperature changes, and it is difficult to maintain the temperature of the electrooptical modulator, to say nothing of the high cost of such devices.

Alternatively, when the light beam is stabilized by feedback control by using the acoustooptical deflector element, in order to reduce the time delay, the light beam is passed very near an ultrasonic wave signal generator, accordingly, the light beam is affected by the influence of the heat generated by the ultrasonic wave signal generator.

SUMMARY OF THE INVENTION

It is an object of the present invention to provide a method for stabilizing the intensity of a light beam, without regard to deflection angles, which is free from the above described disadvantages, and which is reliable and stable.

According to the present invention there is provided a method for stabilizing the intensity of a light beam emitted by a light source and which is deflected by an acoustooptical deflector element controlled by a control signal, comprising the steps of (a) detecting the intensity of the light beam, (b) comparing the detected light beam intensity with a predetermined reference light intensity, (c) detecting the difference between the detected light beam intensity and the reference light intensity, (d) storing a correction signal corresponding to the difference detected into a memory, and (e) controlling the control signal by the correction signal read out of the memory so that the intensity of the light beam through the acoustooptical deflector element may be maintained to a certain level.

BRIEF DESCRIPTION OF DRAWINGS

In order that the present invention may be better understood, preferred embodiments will be described with reference to the accompanying drawings, in which.

DESCRIPTION OF PREFERRED EMBODIMENTS

Figure 1:
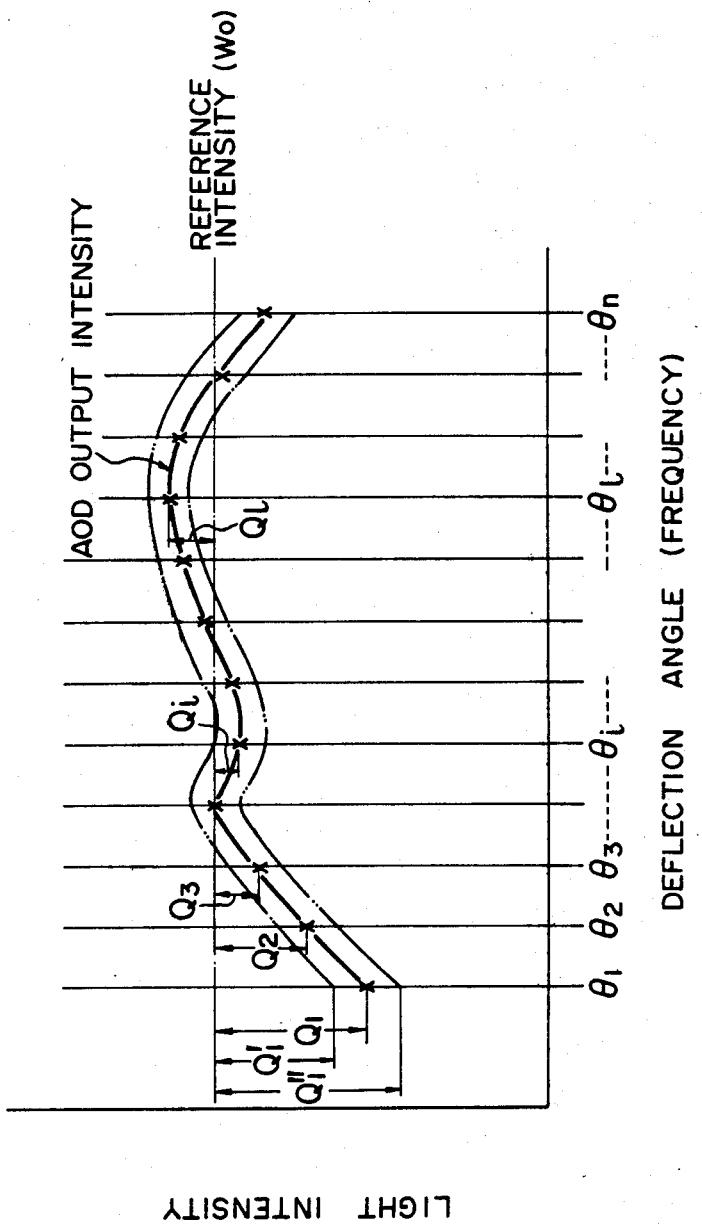
FIG. 1 is a graph showing a relation between light intensity and deflection angle of a light beam through an acoustooptical deflector element, with reference to a reference intensity of the light beam, the deflection angle corresponding to the frequency of an ultrasonic wave signal which is impressed upon the acoustooptical deflector element.

Referring now to the drawings, the first embodiment of the present invention will be described with reference to FIGS. 1 and 2, and the second embodiment will be described with reference to FIGS. 3 and 4.

In FIG. 1 is shown a relation between light intensity and deflection angle of a light beam through an acoustooptical deflector element, with reference to a reference intensity WO. The deflection angle corresponds to a frequency of an ultrasonic wave signal which controls the acoustooptical deflector element.

The intensity of the light beam output from the acoustooptical deflector element varies depending on the deflection angles, as shown in FIG. 1. For example, when the deflection angle is $\theta 1$ or $\theta l$, the insufficient light intensity Q1, which changes in the range between Q1' and Q1'', or the excess light intensity Ql, in comparison with the reference intensity WO is to be increased or to be reduced, viz., in order to correct the intensity of the light beam output to match the reference intensity WO, the amplitude of the ultrasonic wave signal to be impressed to the acoustooptical deflector element is increased or decreased to a certain amount corresponding to the insufficient light intensity Ql or the excess light intensity Ql, which is the amount to be corrected.

When a halftone reproduction picture is reproduced by using a scanning exposure head according to picture signals which are obtained by scanning an original picture in a color scanner, or the like, the width and the center position of the light beam are varied in order to produce halftone dots having a screen angle. In this embodiment, the width and the center position of the light beam are controlled by using an aperture plate and two acoustooptical deflector elements, as described later.

Figure 2:
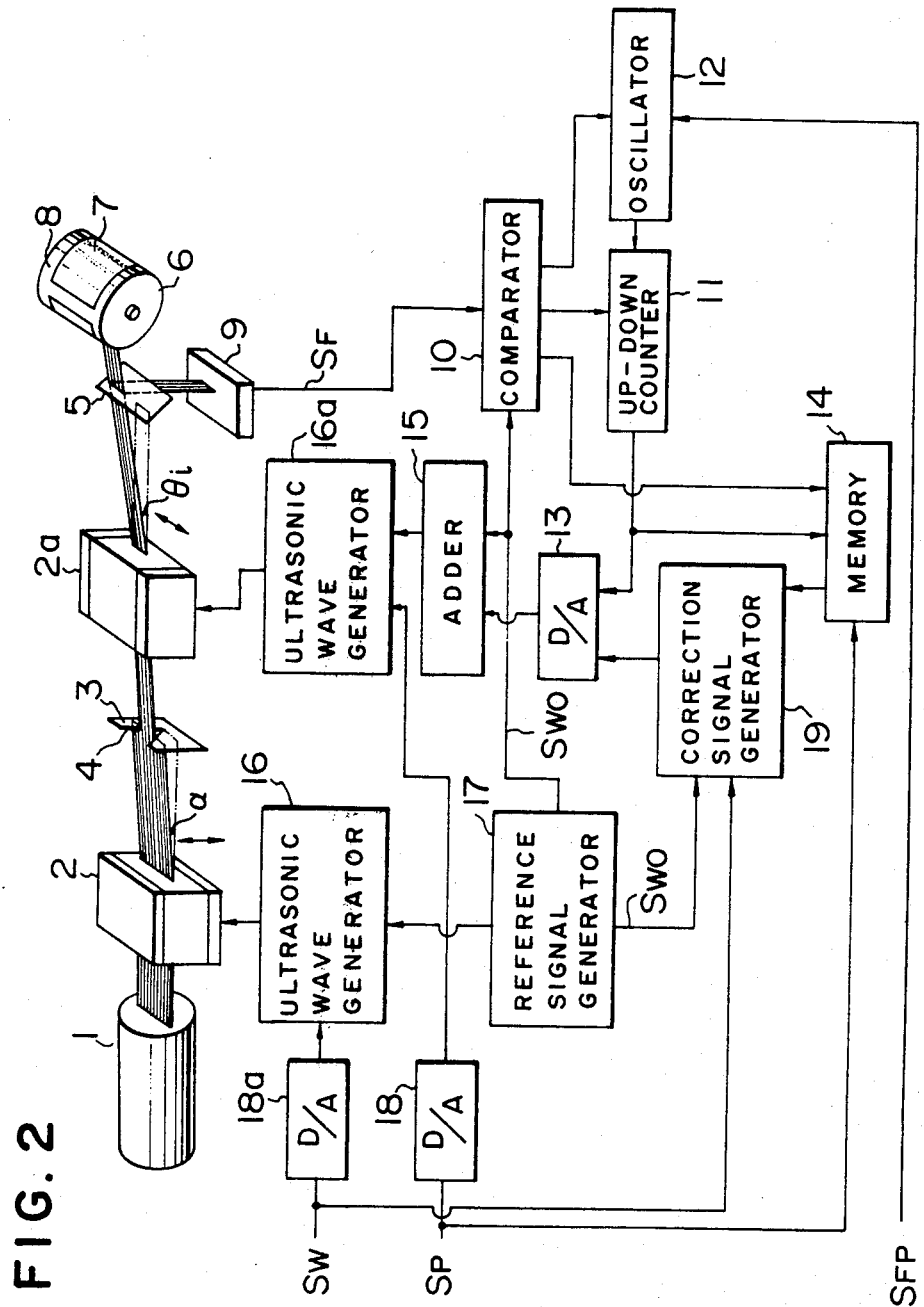
FIG. 2 is a schematic view of a system for performing a method for stabilizing the intensity of a light beam, which is controlled by amplitude modulation, according to the present invention.

In FIG. 2 is shown a system for carrying out a method for stabilizing the intensity of the light beam through the acoustooptical deflector element according to the present invention.

A laser light beam emitted by a laser tube 1 is incident to an acoustooptical deflector element 2 and is deflected vertically there at an angle $\alpha$, as hereinafter described. The deflected laser beam is then passed through a V-shaped aperture 4 of an aperture plate 3, and as the laser beam passes through the aperture 4, the width of the laser beam is restricted to a certain width. The width of the laser beam may be determined by varying the deflection angel $\alpha$. Then, the laser beam is incident to another acoustooptical deflector element 2a and is deflected horizontally there at an angle $\theta i$, as hereinafter described. When the laser beam is deflected by the deflector element 2a, the intensity of the laser beam output from the acoustooptical deflector element 2a is varied depending on the deflection angle $\theta i$, as described above.

The laser beam through the acoustooptical deflector element 2a is incident to a beam splitter 5 in which a part of the laser beam is divided, and then onto a photosensitive material 7 mounted to a recording cylinder 6 in order to print on the photosensitive material 7. The laser beam divided by the beam splitter 5 is received by a detector 9 which detects the intensity of the laser beam.

Then, while no photosensitive material 7 is mounted to the cylinder 6, the correction values corresponding to the correction light intensities Q1–Qn are determined and stored into a memory 14 as follows.

The laser beam is incident to the acoustooptical deflector element 2, and the deflector element 2 is driven or frequency-modulated by an ultrasonic wave signal having a reference frequency, which is generated by an ultrasonic wave generator 16, whose frequency is controlled by a reference signal Swo generated by a reference signal generator 17, so that the laser beam may be deflected vertically at a reference angle $\alpha$ which depends on the frequency of the ultrasonic wave signal. Then, the laser beam passes through the aperture 3 and the width of the laser beam is restricted to WO by the aperture plate 3.

The laser beam having a width WO is then fed to the acoustooptical deflector element 2a deflector element 2a is driven or frequency-modulated by an ultrasonic wave signal generated by an ultrasonic wave generator 16a, whose frequency is controlled by a predetermined position signal Sp which is supplied to the ultrasonic wave generator 16a via a digital-analog converter 18, so that the laser beam may be deflected horizontally at the angle $\theta i$ which depends on the frequency of the ultrasonic wave signal generated by the ultrasonic wave generator 16a.

The laser beam is supplied to the beam splitter 5 and a part of the laser beam is divided thereby. The divided laser beam is sent to the detector 9 which detects the intensity of the laser beam and outputs a feedback signal $S_F$ to a comparator 10.

The reference signal generator 17 sends the reference signal Swo to the comparator 10 which compares the feedback signal $S_F$ with the reference signal Swo. If the difference between the feedback signal $S_F$ and the reference signal Swo is beyond the permitted range, that is, when $S_F$ is larger than Swo, it is larger than its upper limit, or when $S_F$ is smaller than Swo, it is smaller than its lower limit, the comparator 10 sends a "down" or "up" order signal to an "up-down" counter 11 so as to allow the counter 11 to count down or up one step by driving an oscillator 12 which triggers the counter 11.

The negative or the positive one-count signal generated by the up-down counter 11 is fed to a digital-analog converter 13 to be converted into a negative or positive analog signal. The negative or the positive one-count analog signal together with the reference signal Swo are fed to an adder 15 which adds the two signals, and outputs the resulting signal to the ultrasonic wave generator 16a. The ultrasonic wave signal whose frequency is controlled by the position signal Sp, as described above, is amplitude-modulated by the resulting signal sent from the adder 15, so that the intensity of the laser beam deflected by the acoustooptical deflector element 2a which is driven by the amplitude-modulated ultrasonic wave signal may be varied in order to correct the intensity of the laser beam.

The laser beam through the acoustooptical deflector element 2a is sent again to the detector 9 via the beam splitter 5. The same operation as described above is repeated until the difference between the feedback signal $S_F$ and the reference signal Swo is within the permitted range.

When the difference between the feedback signal $S_F$ and the reference signal Swo is within the permitted range, the comparator 10 stops the operations of the up-down counter 11 and the oscillator 12 and sends a writing order signal to the memory 14. Then, according to the writing order signal from the comparator 10, the memory 14 stores the negative or the positive count number counted by the up-down counter 11, which corresponds to the correction light intensity Qi.

Accordingly, the count numbers of the counter 11, corresponding to the correction light intensities Q1–Qn, are determined by varying the deflection angle $\theta i$ from $\theta 1$ to $\theta n$, and then are stored one by one in the memory 14, as described above.

The deflection angle $\theta i$ of the laser beam deflected by the acoustooptical deflector element 2a, which depends on the frequency of the ultrasonic wave signal generated by the ultrasonic wave generator 16a and the frequency of the position signal Sp, as described above, may be varied, in practice, into approximately 100 steps by varying the value of the position signal Sp. Hence, the memory 14 does not require so large capacity. The one step-up or step-down correction cycle, or one amplitude-modulation correction cycle of the ultrasonic wave signal, as described above, may be sufficiently carried out within a period of a signal having a frequency of 200 kilohertz, which includes the propagation time of the laser beam in the acoustooptical deflector element 2a. Hence, the oscillator 12 outputs a trigger signal having a frequency of 200 kilohertz. In practice, even if the deflection angle $\theta i$ of the laser beam is varied to 100 steps, all of the count numbers calculated corresponding to the correction light intensities Q1-Q100, may fully be stored into the memory 14 within one second.

After storing all of such count numbers into the memory 14, as hereinbefore described, the photosensitive material 7 is secured to the cylinder 6, and the printing operation of the reproduction picture is carried out by scanning the photosensitive material by means of the recording head. In this operation, the position signal Sp and a width signal Sw, which are obtained from the picture signals are supplied to the system.

The width signal Sw is sent to the ultrasonic wave generator 16 to via a digital-analog converter 18a wherein the width signal Sw is converted into an analog signal. In the ultrasonic wave generator 16 the width signal Sw controls the frequency of the ultrasonic wave signal which is impressed upon the acoustooptical deflector element 2 so that the deflection angle $\alpha$ of the laser beam deflected by the acoustooptical deflector element 2 may be varied in order to vary the width of the laser beam through the aperture 4 of the aperture plate 3.

The position signal Sp is fed to the ultrasonic wave generator 16a via the digital-analog converter 18 for the frequency-modulation of the ultrasonic wave signal, as described above, and is also sent to the memory 14. The position signal Sp addresses an address $\theta i$ in the memory 14 so as to read out the count number stored therein, corresponding to the correction light intensity Qi, which is sent to a correction signal generator 19.

In the correction signal generator 19, the width signal Sw and the reference signal Swo are fed, and the width of the laser beam is measured depending on the proportion of the width signal Sw to the reference signal Swo which is used as a standard signal. A correction factor corresponding to the width of the laser beam is multiplied by the count number read out of the memory 14. Then, the corrected count number is sent to the digital-analog converter 13 and is converted there into an analog signal.

The analog signal corresponding to the corrected count number and the reference signal Swo are fed to the adder 15 which adds the two signals and sends the resulting signal for the amplitude-modulation of the ultrasonic signal to the ultrasonic wave generator 16a. Then, the laser beam through the aperture 4 of the aperture plate 3 is deflected by the acoustooptical deflector element 2a which is controlled by the ultrasonic wave signal, thereby obtaining the laser beam whose light intensity is maintained to the predetermined value.

The light beam is incident onto the photosensitive material 7 mounted on the cylinder 6 through the beam splitter 5. The detector 9 is adapted to stop its function while the printing operation is carried out.

During a long period of operation, the intensity of the light beam emitted by the laser tube 1 often changes a certain amount. Thus, the count numbers stored in the memory 14 should be corrected depending on such variations. This correction operation is performed in the same manner as hereinbefore described, when the light beam exposes the blank portion 8 of the cylinder's surface. That is, a blank period signal $S_{FP}$ is sent to the oscillator 12 so that the oscillator 12 may be readied for operation, and the operation for correcting and storing the count numbers corrected is carried out in the same manner as described above. Usually, the time of the scanning such a blank portion 8 is not so long that all of the count numbers corresponding to the correction light intensities can be replaced by the corrected ones, and the unfinished count numbers may be done in the next cycle of the cylinder's rotation. Therefore, in practice, the intensity change of the laser beam can substantially be corrected during the printing operation.

Another preferred embodiment of the present invention will be described in connection with FIGS. 3 and 4, wherein the same numerals denote the same members having the same functions as those shown in FIG. 2.

First, the correction of the light intensity by the frequency-modulation is described with reference to FIG. 3.

Figure 3:
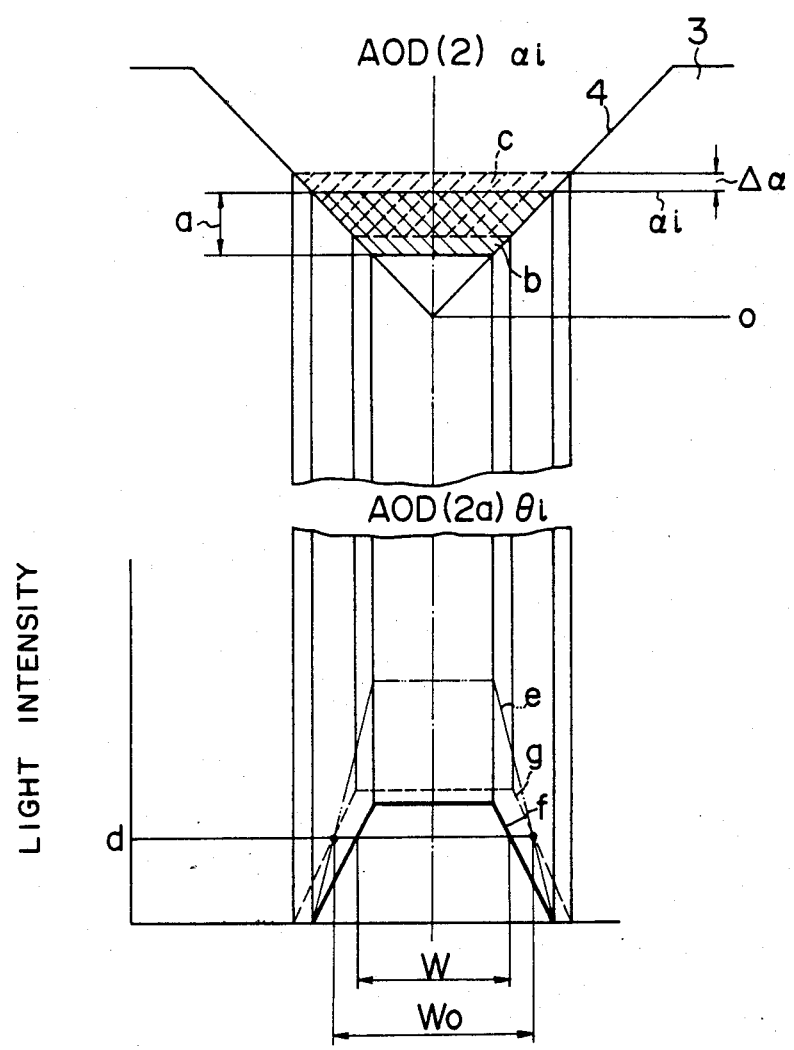
FIG. 3 shows a relation between a light intensity of the light beam through an aperture and a blackened area of a photosensitive material.

In FIG. 3 is shown, in its upper half, a relation between the V-shaped aperture 4 of the aperture plate 3 and the laser beam having a height a, in which the laser beam b is deflected vertically at the angle $\alpha_i$ by the acoustooptical deflector element 2, as shown by solid lines, and the laser beam c is deflected at the angle $\alpha_i + \Delta\alpha$ by the same, as shown by broken lines.

Figure 4:
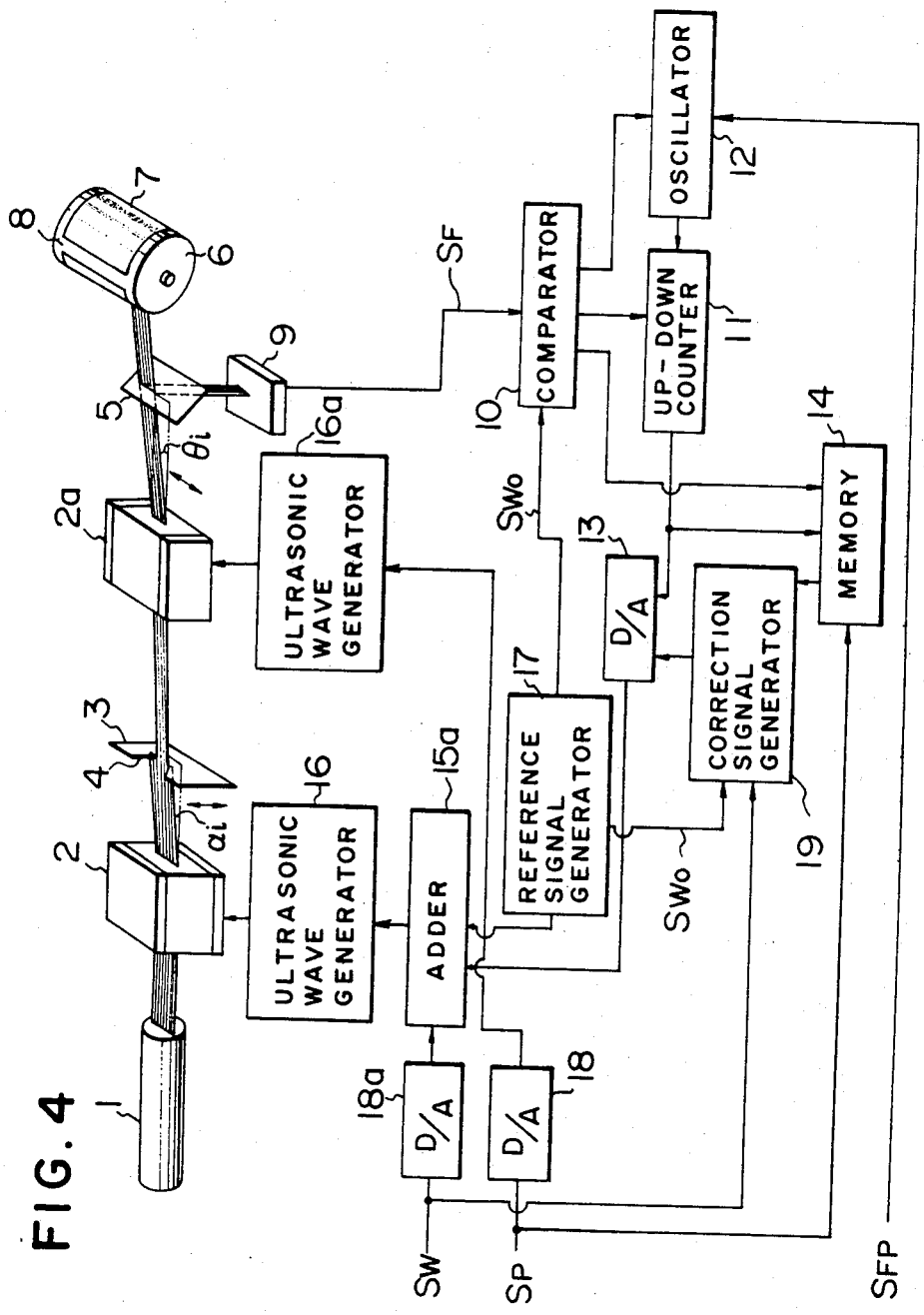
FIG. 4 is a schematic view of another system for performing another method for stabilizing the intensity of a light beam, which is controlled by frequency modulation, according to the present invention.

Both the laser beam b and c are deflected then horizontally at the angle $\theta i$, as shown in FIG. 4, by the acoustooptical deflector element 2a, and then the beams b and c are incident to the photosensitive material 7 through the beam splitter 5. The intensities of the beams b and c on the photosensitive material 7 are schematically shown by a solid line f and a broken line g, respectively, in the lower half of FIG. 3.

A symbol d indicates a critical exposure light intensity of a general lithographic film, as shown in FIG. 3. By the intensity above d the film is blackened but below d the film is not blackened completely.

A width W of the film is blackened by the laser beam b. If the laser beam b through the deflector element 2a is ideal, viz., its light intensity is not reduced, the intensity of the beam b should be shown by a two-dotted line e, and its blackened width should be WO which is the desired width, between the intersections of the ideal intensity line e and the critical exposure light intensity d.

The desired blackened width WO is obtained as follows. That is, the laser beam b is further deflected through the angle $\Delta\alpha$ by the acoustooptical deflector element 2, as shown by the beam c, so that the blackened width of the film, which is exposed by the beam c, may be the desired width WO which is between the intersections of the light intensity line g of the beam c and the critical exposure light intensity d.

Consequently, in order to correct the light intensity of the laser beam which is first deflected vertically at the angle $\alpha$ by the acoustooptical deflector element 2 which is controlled by the width signal Sw and is next deflected horizontally at the angle $\theta i$ by the acoustooptical deflector element 2a which is controlled by the position signal Sp, the ultrasonic wave signal generated by the ultrasonic wave generator 16 is frequency-modulated so that the laser beam may be deflected at the angle $\alpha_i + \Delta\alpha$ by the deflector element 2.

As a matter of fact, the embodiment described above in connection with FIG. 3 satisfies the fact that the intensity of the laser beam is under the reference intensity WO and the light intensity line increases, as shown by the deflection angle $\theta_1$, $\theta_2$ or $\theta_3$ in FIG. 1. When the intensity of the laser beam is under the reference intensity WO and the light intensity line decreases, as shown by the deflection angle θi in FIG. 1, in order to correct the light intensity the laser beam is further deflected through the angle Δα, but, in this case, the uppermost light intensity of the line g should be lower than that of the line f.

However, when the intensity of the laser beam is greater than the reference intensity WO, the correction deflection angle Δα has a negative value. In such a case, the uppermost intensity of the line f is larger than that of the ideal line e. When the light intensity line increases, as shown by the deflection angle θk, the uppermost intensity of the line g is lower than that of the line f. When the light intensity line decreases, as shown by the deflection angle θm, the uppermost intensity of the line g is higher than that of the line f. In any of these cases, the uppermost intensities of the lines f and g must be larger than the critical exposure light intensity d.

In FIG. 4, there is shown another system for carrying out another method described in connection with FIG. 3 for stabilizing the intensity of the light beam according to the present invention.

In this embodiment, the laser beam emitted by the laser tube 1 is first deflected vertically at an angle αi by the acoustooptical deflector element 2 and then is passed through the aperture plate 3. Then, the laser beam is deflected horizontally at the angle θi by the acoustooptical deflector element 2a.

In this case, the correction of the intensity of the laser beam is carried out by varying the vertical deflection angle αi, i.e. by varying the frequency of the ultrasonic wave signal which is generated by the ultrasonic wave generator 16 and is impressed to the acoustooptical deflector element 2.

The one-count signal sent from the digital-analog converter 13 and the width signal Sw via the digital-analog converter 18a are fed to an adder 15a which adds the two signals and outputs the resulting signal to the ultrasonic wave generator 16 for driving the acoustooptical deflector element 2. In the ultrasonic wave generator 16, the ultrasonic wave signal is frequency-modulated by the resulting signal sent from the adder 15a so that the laser beam may be deflected at the desired angle by the deflector element 2 which is controlled by the frequency-modulated ultrasonic wave signal and then the width of the laser beam may be restricted to the desired width by the aperture plate 3, as hereinbefore described with reference to FIG. 3. The other operations, the other members and their functions are quite the same as those in FIG. 2, and accordingly the explanations thereof are omitted for the simplicity of the description.

Although the present invention has been described with reference to preferred embodiments in connection with the accompanying drawings, however, various changes and modifications can be made by those skilled in the art without departing from the scope of the present invention.

What is claimed is:

1. A method for stabilizing the intensity of a light beam emitted by a light source and deflected by an acoustooptical deflector element which is controlled by a control signal, comprising the steps of:
   (a) detecting the intensity of the light beam;
   (b) comparing the light beam intensity detected with a predetermined reference light intensity;
   (c) detecting the difference between the light beam intensity and the reference light intensity;
   (d) storing a correction signal, corresponding to the difference detected into a memory; and
   (e) controlling the control signal by the correction signal read out of the memory so that the intensity of the light beam through the acoustooptical deflector element may be maintained to a certain level.

2. A method as defined in claim 1, wherein the control signal is amplitude-modulated by the correction signal.

3. A method as defined in claim 2, including two acoustooptical deflector elements, wherein the light beam is deflected vertically by one acoustooptical deflector element and is deflected horizontally by the other acoustooptical deflector element.

4. A method as defined in claim 3, wherein the acoustooptical deflector element which deflects the light beam horizontally, is controlled by the control signal.

5. A method as defined in claim 1, wherein the control signal is frequency-modulated by the correction signal.

6. A method as defined in claim 1 or 5, including two acoustooptical deflector elements, wherein the light beam is deflected vertically by one acoustooptical deflector element and is deflected horizontally by the other acoustooptical deflector element.

7. A method as defined in claim 6, wherein the acoustooptical deflector element which deflects the light beam vertically, is controlled by the control signal.

8. A method as defined in claim 1 or 5, wherein the width of the light beam is changed by a combination of an aperture plate having an aperture and an acoustooptical deflector element.

9. A method as defined in any of claims 1–5, wherein when the light beam exposes a predetermined blank portion, the difference between the light beam intensity and the reference light intensity is detected, and then the correction signal corresponding to the difference detected is stored into the memory.

10. A method as defined in any of claims 1–5, wherein the control signal is an ultrasonic wave signal generated by an ultrasonic wave generator.

* * * * *